(12) United States Patent
Inoue (10) Patent No.: US 10,173,490 B2
(45) Date of Patent: Jan. 8, 2019

(54) DYNAMIC DAMPER CONTROL DEVICE (71) Applicant: HONDA MOTOR CO., LTD., Tokyo (JP)

(72) Inventor: Toshio Inoue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 192 days.

(21) Appl. No.: 15/414,935

(22) Filed: Jan. 25, 2017

(65) Prior Publication Data
US 2017/0217277 A1    Aug. 3, 2017

(30) Foreign Application Priority Data

Jan. 29, 2016 (JP) ................................. 2016-015789

(51) Int. Cl.
*B60G 17/018* (2006.01)
*B60G 17/06* (2006.01)

(52) U.S. Cl.
CPC ........... *B60G 17/06* (2013.01); *B60G 17/018* (2013.01); *B60G 2400/10* (2013.01); *B60G 2600/26* (2013.01); *B60G 2800/18* (2013.01); *B60G 2800/916* (2013.01)

(58) Field of Classification Search
CPC .............. B60G 17/018; B60G 2400/10; B60G 2600/26; B60G 2800/18; B60G 2800/916
See application file for complete search history.

(56) References Cited

FOREIGN PATENT DOCUMENTS

| JP | 2016-1008 A | 1/2016 |
|---|---|---|
| WO | 2012/026332 A1 | 3/2012 |

*Primary Examiner* — Calvin Cheung
(74) *Attorney, Agent, or Firm* — Westerman, Hattori, Dnaiels & Adrian, LLP (57) ABSTRACT

A controller includes a target frequency determining unit, first and second acceleration sensors, and a predetermined variable calculator. The target frequency determining unit determines a target frequency from a vibration state of a vibration source. The first acceleration sensor obtains a first acceleration of a mass member. The second acceleration sensor obtains a second acceleration of a vibration controlled member. The predetermined variable calculator calculates a predetermined variable of a transfer function of the first acceleration with respect to the second acceleration at the target frequency. If the predetermined variable is a numeric value other than 0, the controller changes a magnetic force generated in an electromagnet.

7 Claims, 8 Drawing Sheets

DYNAMIC DAMPER CONTROL DEVICE

CROSS REFERENCES TO RELATED APPLICATIONS

The present application claims priority under 35 U.S.C. § 119 to Japanese Patent Application No. 2016-015789, filed Jan. 29, 2016, entitled "Dynamic Damper Control Device." The contents of this application are incorporated herein by reference in their entirety.

TECHNICAL FIELD

The present disclosure relates to a dynamic damper control device that controls a dynamic damper which reduces the vibration of a vibrator.

BACKGROUND

Dynamic dampers (dynamic vibration absorbers) have widely been used to reduce the vibration of machines. The dynamic damper is a component constituted by a mass and a spring having the same proper frequency as the frequency of a subject vibration. The dynamic damper reduces a subject vibration as a result of vibrating 180° out of phase with the subject vibration and also by utilizing the inertia of the mass.

The proper frequency (natural frequency) f is expressed by:

$$f = \omega/2\pi = (1/2\pi)\sqrt{(K/M)}$$

where $\omega$ is a proper value, K is a spring constant, and M is a mass.

A typical dynamic damper reduces a subject vibration as a result of vibrating 180° out of phase with the subject vibration at a proper frequency f determined by the ratio of a spring constant K to a mass M and also by utilizing the inertia of the mass M. Consequently, one dynamic damper is required for one frequency. The use of plural dynamic dampers having close proper frequencies f may cause the interference of vibrations and even increase the vibrations.

A dynamic damper may be used for reducing noise caused by the vibration of an engine. In this case, the frequency of the vibration may vary in synchronization with the engine speed, and the dynamic damper may have to deal with plural frequencies.

To handle such a situation, a dynamic damper that can make the proper frequency f variable by using a magnetorheological elastomer (MRE) as a spring has been proposed (see, for example, International Publication No. 2012-026332). In such a dynamic damper, the strength of magnetic fields generated by a current flowing through a coil and applied to rubber mixed with a magnetic body is controlled, thereby making the stiffness of the rubber variable.

Typically, such a variable dynamic damper using MRE is controlled by reading a current value from a preset correlation table in which current values and rubber stiffness values are associated with each other. However, the spring constant of rubber varies according to the temperature and also changes over time. The properties of rubber are also different depending on the manufacturing variations. It is thus difficult to achieve the long-term stability and effectiveness in controlling such a dynamic damper.

In view of this background, the following control method for adjusting the frequency of a dynamic damper has been proposed (see, for example, Japanese Unexamined Patent Application Publication No. 2016-1008). By using a vibration detector for detecting the vibration of a movable mass, a displacement detector for detecting the displacement of a spring, and a frequency detector for detecting the frequency (such as an engine speed signal) to determine the frequency for reducing the vibration, the frequency of a dynamic damper is caused to follow the detected frequency.

This control method will be discussed more specifically. The equation of motion of the mass M is expressed by:

$$Ma = -KX$$

where a is the acceleration and X is the displacement of a spring (spring constant K). This equation can be modified into:

$$a/X = -(K/M)$$

The proper value f is expressed by:

$$f = (1/2\pi)\sqrt{(K/M)}.$$

That is, the ratio of the vibration acceleration of the movable mass to the displacement of the spring is proportional to the square of the proper value of the mass M and the spring (spring constant K). By using this theory, $f^2$ (the square of the detected frequency f of the engine) and $|a/X|$ are successively compared with each other. If $f^2$ is smaller than $|a/X|$, the spring constant K is increased by $\Delta K$ (the current applied to the coil is increased). If $f^2$ is greater than $|a/X|$, the spring constant K is decreased by $\Delta K$ (the current applied to the coil is decreased).

SUMMARY

If, for example, the frequency of a dynamic damper using MRE is desirably adjusted to 200 Hz, the ratio of the vibration acceleration of the movable mass to the displacement of the spring is calculated as about $1200^2$ from the following equation:

$$a/X = -(K/M) = -(2\pi f)^2$$

In this calculation, X is a very small value in relation to a, and it is very difficult to implement the above-described control method by an inexpensive microcomputer. The calculated values by an inexpensive microcomputer are unreliable in terms of the precision, and may exceed the number of bits that can be calculated by an inexpensive microcomputer.

The present application describes, for example, a dynamic damper control device that can implement a control method for adjusting the frequency of a dynamic damper by causing it to follow the frequency of a subject vibration (target frequency) with the use of a control unit constituted by an inexpensive processor including a fixed-point arithmetic unit and also that can cause the frequency of the dynamic damper to follow the target frequency speedily.

[1] A dynamic damper control device according to one aspect of the present disclosure includes a vibration controlled member, a mounting member, a magnetorheological elastomer, an electromagnet, and an elasticity properties controller. The vibration controlled member vibrates in accordance with a vibration source. The mounting member is interconnected to the vibration controlled member. The magnetorheological elastomer elastically interconnects the mounting member and a mass member. The electromagnet generates a magnetic force to be applied to the magnetorheological elastomer. The elasticity properties controller controls elasticity properties of the magnetorheological elastomer by adjusting a current to be supplied to the electromagnet. The elasticity properties controller includes a target frequency determining unit, first and second acceleration obtaining units, and a predetermined variable calculator. The target frequency determining unit determines a target frequency from a vibration state of the vibration source. The first acceleration obtaining unit obtains a first acceleration of the mass member. The second acceleration obtaining unit obtains a second acceleration of the vibration controlled member. The predetermined variable calculator calculates a predetermined variable of a transfer function of the first acceleration with respect to the second acceleration at the target frequency. If the predetermined variable is a numeric value other than 0, the elasticity properties controller changes the magnetic force generated in the electromagnet.

This configuration makes it possible to implement a control method for adjusting the frequency of a dynamic damper by causing it to follow the frequency of a subject vibration (target frequency) with the use of a control unit constituted by an inexpensive processor including a fixed-point arithmetic unit, and also to cause the frequency of the dynamic damper to follow the target frequency speedily.

[2] If the predetermined variable is a positive numeric value, the elasticity properties controller may decrease the magnetic force generated in the electromagnet. If the predetermined variable is a negative numeric value, the elasticity properties controller may increase the magnetic force generated in the electromagnet.

In a frequency range in which the present proper value of the dynamic damper is lower than the target frequency (target proper value), the predetermined variable of the transfer function takes a positive numeric value. The magnetic force to be applied to the magnetorheological elastomer is thus reduced so that the modulus of elasticity of the magnetorheological elastomer can be decreased. In contrast, in a frequency range in which the present proper value of the dynamic damper is higher than the target frequency (target proper value), the predetermined variable of the transfer function takes a negative numeric value. The magnetic force to be applied to the magnetorheological elastomer is thus enhanced so that the modulus of elasticity of the magnetorheological elastomer can be increased. This adjustment enables the proper value of the dynamic damper to speedily follow the target frequency ft (target proper value) in real time.

[3] The predetermined variable may be a coefficient proportional to a real part of the transfer function which is expressed as a complex number.

Instead of calculating a complicated transfer function, the predetermined variable, which is a coefficient proportional to the real part of the transfer function, is merely calculated. The predetermined variable is thus easier to calculate than a complicated transfer function. That is, the predetermined variable can be calculated with fewer calculation steps by using a control unit constituted by an inexpensive processor including a fixed-point arithmetic unit.

The magnetic force generated in the electromagnet is controlled merely based on the sign of the predetermined variable. Thus, as in the calculation of the predetermined variable, this control operation can also be conducted with fewer calculation steps by using the above-described control unit.

[4] The elasticity properties controller may include first and second reference signal generators and first and second vibration properties calculators. The first reference signal generator generates a first reference signal based on the target frequency. The second reference signal generator generates a second reference signal based on the target frequency. The second reference signal reflects a predetermined phase difference with respect to the first reference signal. The first vibration properties calculator calculates, based on the first reference signal, first vibration properties expressed as a complex number concerning the first acceleration. The second vibration properties calculator calculates, based on the second reference signal, second vibration properties expressed as a complex number concerning the second acceleration. The predetermined variable calculator may calculate, as the predetermined variable, a coefficient proportional to a real part of the transfer function expressed as a complex number. The transfer function is obtained by dividing the first vibration properties by the second vibration properties.

If the phase difference of the transfer function at the target frequency is −90°, the predetermined phase difference of the second reference signal is set to be 0°. If the phase difference of the transfer function at the target frequency is −45°, the predetermined phase difference of the second reference signal is set to be 45°. This makes it possible to correctly calculate the predetermined variable even if the attenuation of the magnetorheological elastomer is high. For example, the attenuation of the magnetorheological elastomer may become high due to a change in the dynamic damper over time. In this case, the predetermined phase difference is set in accordance with the phase difference of the transfer function at the target frequency. Then, the predetermined variable reflecting the properties of the magnetorheological elastomer can easily be obtained without making significant design change.

BRIEF DESCRIPTION OF THE DRAWINGS

The advantages of the disclosure will become apparent in the following description taken in conjunction with the following drawings.

DETAILED DESCRIPTION

A dynamic damper control device 10 according to an embodiment of the present disclosure will be described below with reference to FIGS. 1 through 8.

Figure 1:
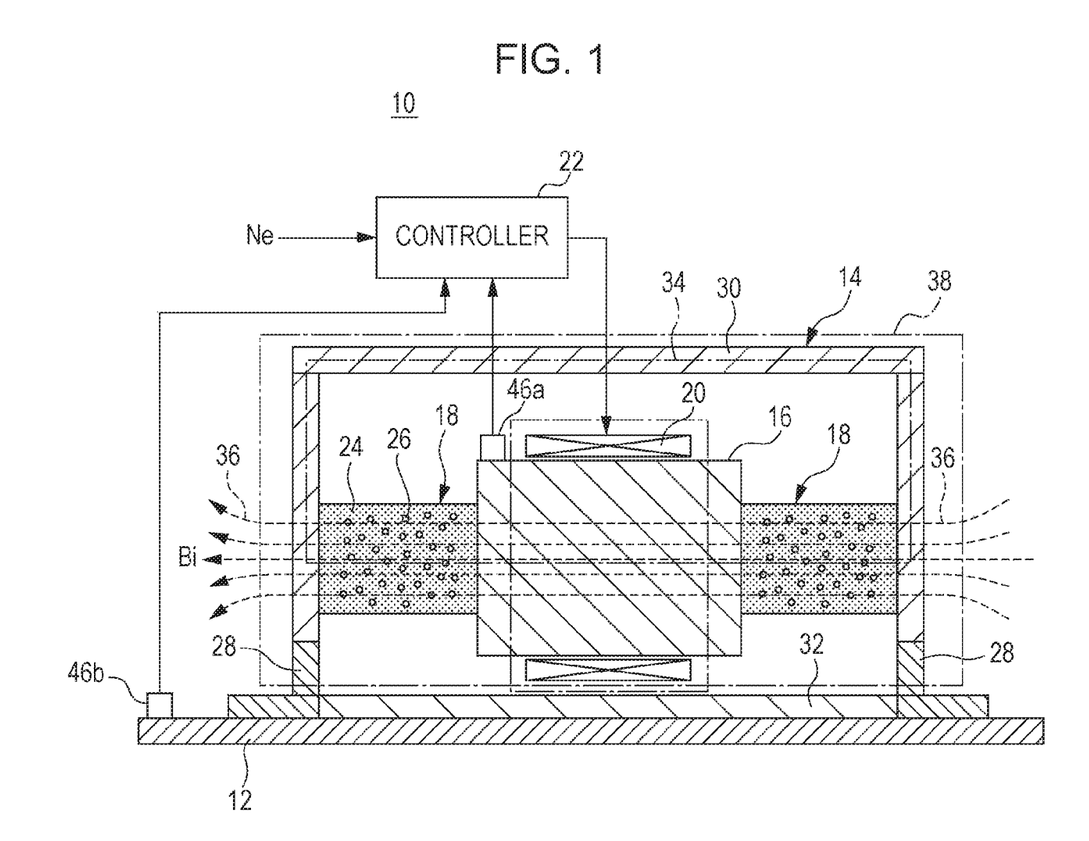
FIG. 1 is a sectional view illustrating the schematic configuration of a dynamic damper control device according to an embodiment.

As shown in FIG. 1, the dynamic damper control device 10 is fixed to a vibration transfer path of a vibration controlled member 12. If a vibration controlled object is, for example, a vehicle, the vibration controlled member 12 may be a subframe on which an engine (not shown) is installed.

The dynamic damper control device 10 includes a mounting member 14, a pair of magnetorheological elastomers (hereinafter called MREs) 18, an electromagnet 20, and a controller 22 (elasticity properties controller). The mounting member 14 is connected to the vibration controlled member 12. The pair of MREs 18 elastically connects the mounting member 14 and a mass member 16. The electromagnet 20 generates a magnetic force applied to the MREs 18. The controller 22 controls the elasticity properties of the MREs 18 by adjusting the current to be supplied to the electromagnet 20.

The MREs 18 include an elastomer matrix 24 (elastic material) having viscoelasticity and many conductive magnetic particles 26 dispersed within the elastomer matrix 24. Due to the magnetic particles 26 disposed within the MREs 18, the modulus of elasticity of the MREs 18 varies in accordance with the strength of magnetic fields Bi applied to the MREs 18, and the electrical resistivity of the MREs 18 in a predetermined direction also varies due to the deformation of the MREs 18.

The elastomer matrix 24 is made of a known polymeric material exhibiting viscoelasticity at room temperature, such as silicone rubber.

Examples of the materials for the magnetic particles 26 are iron, iron nitride, iron carbide, carbonyl iron, magnetic iron oxides, ferrites, nickel, cobalt, cobalt iron alloys, magnetite, and goethite. The average particle size of the magnetic particles 26 is 50 µm or smaller, for example.

The mounting member 14 includes a pair of brackets 28 and a yoke member 30 fixed on the pair of brackets 28.

The pair of brackets 28 may be made of a nonmagnetic material or a magnetic material (such as iron), and is formed in a substantially L shape in cross section, for example. The pair of brackets 28 is integrally fixed to the vibration controlled member 12 by a suitable fixing medium, such as bolting or welding (not shown). As shown in FIG. 1, a member 32 may be provided integrally or separately between the pair of brackets 28 to interconnect the brackets 28.

The yoke member 30 is fixed on the pair of brackets 28 and is formed to surround the top and side portions of the structure constituted by the mass member 16 and the MREs 18. The yoke member 30 is made of a magnetic material (such as iron). With this configuration, the application of magnetic fields Bi forms a closed magnetic circuit 34 (mass member 16→MREs 18→yoke member 30→MREs 18→mass member 16) indicated by the long dashed double-dotted lines in FIG. 1. That is, the mounting member 14 can prevent a leakage of magnetic flux as a result of surrounding the top and side portions of the above-described structure by the yoke member 30.

As described above, the pair of brackets 28 may be made of a nonmagnetic material or a magnetic material. However, if the vibration controlled member 12 is made of a magnetic material, the use of the pair of brackets 28 made of a magnetic material may cause magnetic lines of force 36 to leak and diffuse toward the vibration controlled member 12. This may cause a loss in the displacement of the MREs 18. Thus, if the vibration controlled member 12 is made of a magnetic material, the pair of brackets 28 made of a nonmagnetic material may preferably be used.

The mass member 16 is supported by the vibration controlled member 12 by using the MREs 18 and the mounting member 14. The mass member 16 has opposing outer surfaces. The MREs 18 are fixed to the outer surfaces of the mass member 16 so that the mass member 16 can extend between the MREs 18. In this embodiment, the mass member 16 can reciprocate in the top-bottom direction, and thus, the top-bottom direction is the vibration controlled direction.

The electromagnet 20 receives power from the controller 22 and thereby applies magnetic fields Bi to the MREs 18. A driving current supplied to the electromagnet 20 can change the strength of magnetic fields Bi applied to the MREs 18. The windings of the electromagnet 20 are disposed to surround the mass member 16 such that the axial line of the windings coincides with that of the MREs 18.

As a result of supplying a current to the electromagnet 20, magnetic fields Bi are generated in the electromagnet 20 and are applied to the MREs 18. The magnetic fields Bi are generated so that the magnetic lines of force 36 travel from one MRE 18 to the other MRE 18, as indicated by the dashed lines in FIG. 1. The strength of the magnetic fields Bi generated in the electromagnet 20 varies in accordance with the driving current flowing through the electromagnet 20. A higher driving current generates stronger magnetic fields Bi.

By the application of magnetic fields Bi to the MREs 18 as a result of supplying a current to the electromagnet 20, the magnetic particles 26 are polarized in accordance with the strength of the magnetic fields Bi so as to encourage magnetic coupling. For example, the magnetic particles 26 are linked to each other to form a network structure. This makes the modulus of elasticity (stiffness) of the MREs 18 be higher than that of the elastomer matrix 24. As the magnetic fields Bi applied to the MREs 18 are stronger, the magnetic coupling between the magnetic particles 26 is more encouraged, thereby increasing the modulus of elasticity of the MREs 18. That is, a higher driving current supplied to the electromagnet 20 increases the modulus of elasticity of the MREs 18, and the MREs 18 are less likely to deform in response to a load.

Figure 2:
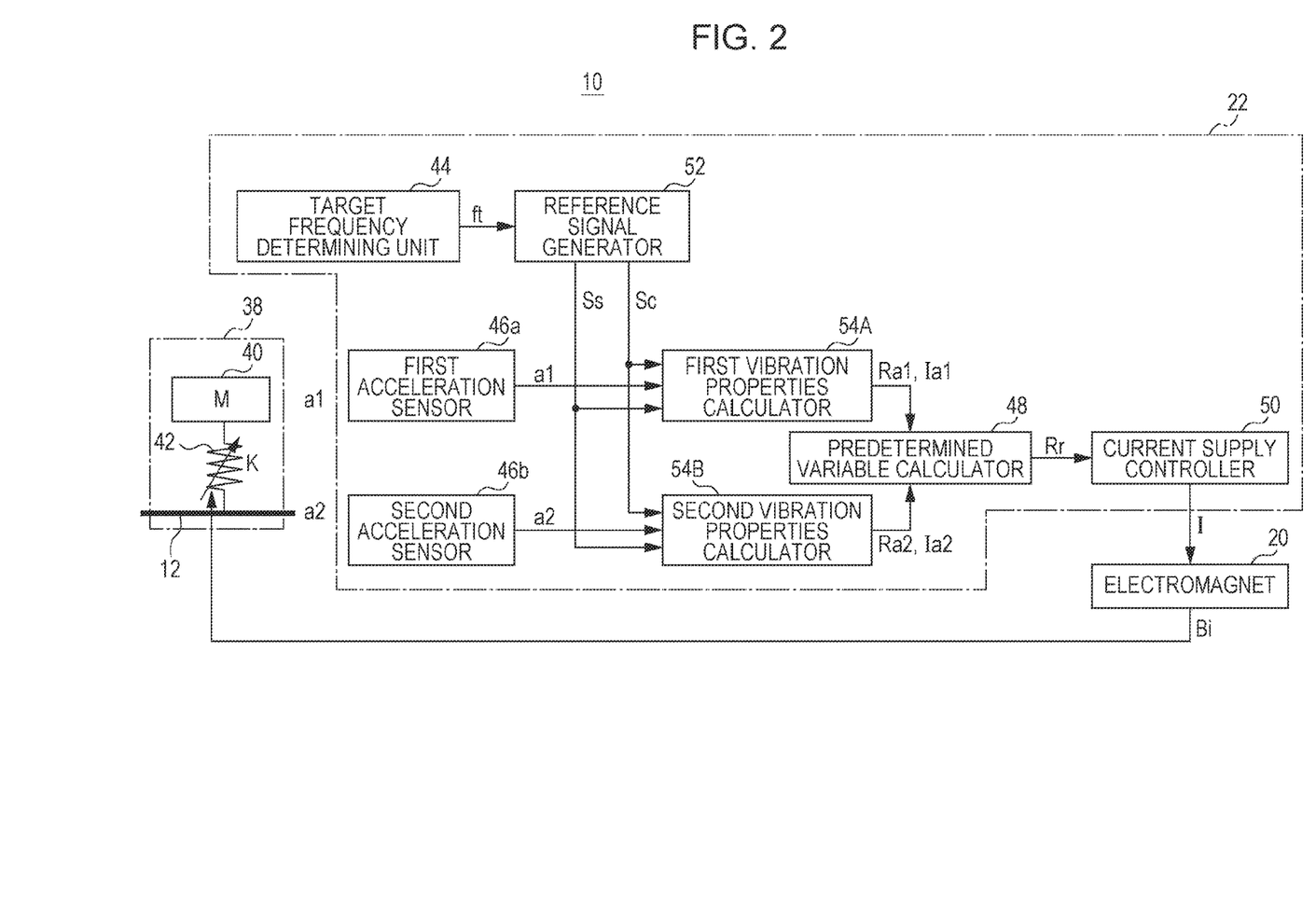
FIG. 2 is a block diagram illustrating the schematic configuration of the dynamic damper control device.

The mounting member 14, the pair of MREs 18, and the mass member 16 form a dynamic damper 38. In the dynamic damper 38, as schematically shown in FIG. 2, a movable mass 40 is connected to the vibration controlled member 12 via a spring 42. The movable mass 40 corresponds to the mass member 16, and the spring 42 corresponds to the pair of MREs 18.

The resonant frequency f of the dynamic damper 38 constituted by the movable mass 40 and the spring 42 shown in FIG. 2 is expressed by:

$$f = (1/2\pi)\sqrt{(K/M)}$$

where M is the mass of the movable mass 40, and K is the spring constant of the spring 42.

The dynamic damper 38 reduces the vibration of the vibration controlled member 12 as a result of vibrating 180° out of phase with the vibration frequency fc of the vibration controlled member 12 and by utilizing the inertia of the movable mass 40. As discussed above, the controller 22 can change the modulus of elasticity of the MREs 18. This makes it possible to adjust the resonant frequency f of the dynamic damper 38 to the variable vibration frequency fc of the vibration controlled member 12.

The controller 22 is formed as a built-in electronic device or a large scale integration (LSI) device in which a microprocessor, a read only memory (ROM), and a random access memory (RAM) are integrated. The controller 22 is fixed at a suitable position within a dashboard, for example.

As described above, the controller 22 supplies power to the electromagnet 20 and changes the current I supplied to the electromagnet 20 so as to vary the strength of magnetic fields Bi generated in the electromagnet 20. The magnitude of the current I supplied to the electromagnet 20 is continuously variable.

The controller 22 will be described below in detail with reference to FIG. 2. In FIG. 2, a modeled dynamic damper 38 is shown.

The controller 22 includes a target frequency determining unit 44, first and second acceleration sensors 46a and 46b, a predetermined variable calculator 48, and a current supply controller 50. The target frequency determining unit 44 determines a target frequency ft from the vibration state of the engine, which is a vibration source. The first acceleration sensor 46a obtains a first acceleration a1 of the mass member 16, which is the movable mass 40. The second acceleration sensor 46b obtains a second acceleration a2 of the subframe, which is the vibration controlled member 12. The predetermined variable calculator 48 calculates a predetermined variable of a transfer function of the first acceleration a1 with respect to the second acceleration a2 at the target frequency ft. If the predetermined variable is a numeric value other than 0, the current supply controller 50 varies the current supplied to the electromagnet 20 in accordance with the sign (positive or negative) of the predetermined variable.

As shown in FIG. 1, the first acceleration sensor 46a is mounted on the top surface of the mass member 16, for example, and detects the first acceleration a1 in the vibration direction (top-bottom direction in this embodiment) of the mass member 16.

As shown in FIG. 1, the second acceleration sensor 46b is mounted on the top surface of the vibration controlled member 12, for example, and detects the second acceleration a2 in the vibration direction (top-bottom direction in this embodiment) of the vibration controlled member 12.

The controller 22 also includes a reference signal generator 52. Based on the target frequency ft output from the target frequency determining unit 44, the reference signal generator 52 generates a real-part reference signal Sc (=cos(ωt)) and an imaginary-part reference signal Ss (=sin(ωt)) of the target frequency ft (or ω=2 πft).

The controller 22 also includes first and second vibration properties calculators 54A and 54B. The first vibration properties calculator 54A calculates the vibration properties of the target frequency ft concerning the first acceleration a1, based on the real-part reference signal Sc and the imaginary-part reference signal Ss output from the reference signal generator 52. The second vibration properties calculator 54B calculates the vibration properties of the target frequency ft concerning the second acceleration a2, based on the real-part reference signal Sc and the imaginary-part reference signal Ss output from the reference signal generator 52.

The predetermined variable calculator 48 calculates a predetermined variable, which is a coefficient proportional to the real part of the transfer function, based on the vibration properties output from each of the first and second vibration properties calculators 54A and 54B. The current supply controller 50 varies the current to be supplied to the electromagnet 20 in accordance with the sign of the predetermined variable calculated by the predetermined variable calculator 48, thereby changing the magnetic force generated in the electromagnet 20.

The principle of current supply control performed by the controller 22 for controlling the supply of the current to the electromagnet 20 will briefly be discussed below with reference to FIGS. 2 through 5B.

The equation of motion of the movable mass 40 is expressed by:

$$Ma1 = -KX$$

where M is the mass of the movable mass 40, a1 is the acceleration, and X is the displacement of a spring (spring constant K). This equation can be modified into:

$$a1/X = -K/M.$$

The proper value f is expressed by:

$$f = (1/2\pi)\sqrt{(K/M)}.$$

If the mass of the movable mass 40 is 0.5 kg and the spring constant K of the spring 42 is 50 N/mm, the proper value f is calculated as about 50 Hz.

Figure 3A:
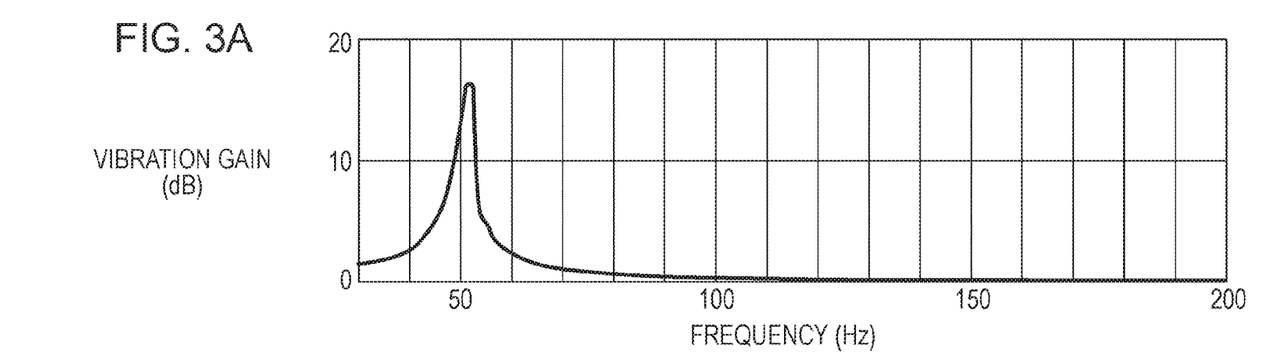
FIG. 3A is a graph illustrating the vibration gain of the ratio of a first acceleration to a second acceleration with respect to the frequency.
Figure 3B:
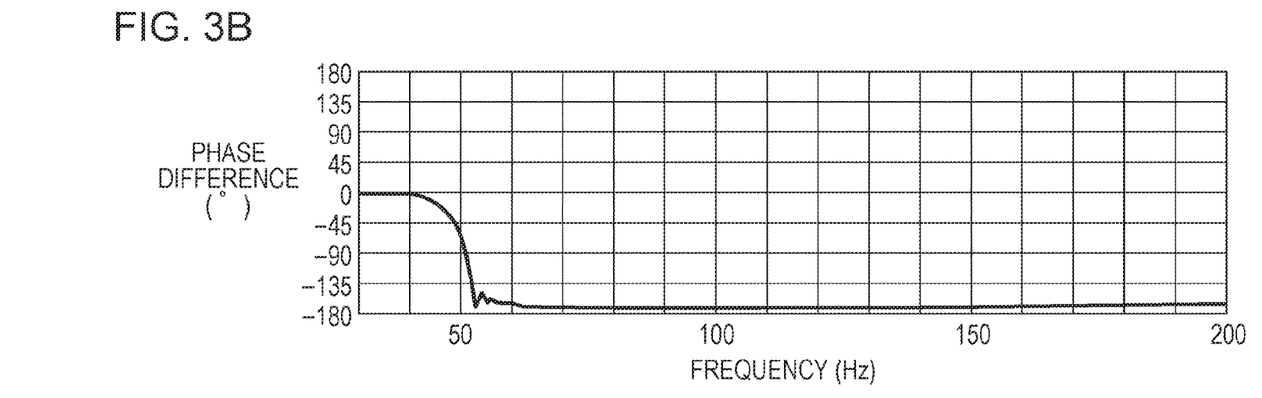
FIG. 3B is a graph illustrating the phase difference of the ratio of the first acceleration to the second acceleration with respect to the frequency.

The vibration gain and the phase difference of the ratio (a1/a2) of the acceleration of the movable mass 40 (first acceleration a1) to the acceleration of the vibration controlled member 12 (second acceleration a2) with respect to the frequency are respectively shown in FIGS. 3A and 3B.

As shown in FIGS. 3A and 3B, the vibration gain is maximized and the phase difference is −90° when the proper value f is around 50 Hz. That is, when the attenuation of the spring 42 supporting the movable mass 40 is low, the proper value is positioned where the phase difference is about −90°. Consequently, taking the following steps (a) through (d) makes it possible to understand how to control the proper value of the dynamic damper 38.

(a) The first acceleration a1 of the movable mass 40 of the dynamic damper 38 and the second acceleration a2 of the vibration controlled member 12 to which the dynamic damper 38 is attached are detected.

(b) Frequency analysis is conducted on the ratio of the first acceleration a1 to the second acceleration a2 (a1/a2).

(c) As a result of the frequency analysis, the frequency at which the vibration gain is maximized or the phase difference is −90° is determined.

(d) The determined frequency and the target frequency ft detected from the engine speed Ne are compared with each other.

If the above-described steps are performed by fast Fourier transform (FFT), for example, the calculation load becomes relatively high. These steps are thus difficult to achieve by an inexpensive processor.

In this embodiment, the above-described steps are performed by using the following simple method.

Figure 4A:
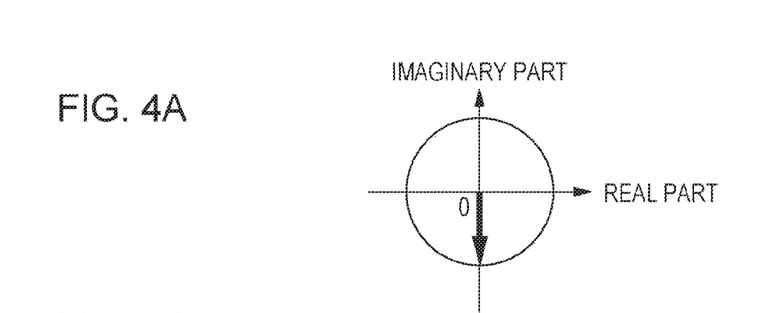
FIG. 4A is a diagram illustrating the vibration gain and the phase difference represented by using a real part and an imaginary part.

As shown in FIG. 4A, the vibration gain and the phase difference are represented by using a real part and an imaginary part. As shown in FIG. 4A, the real part is 0 and the imaginary part is minimum with respect to the proper value. This means that the phase difference is −90° with respect to the proper value.

Figure 4B:
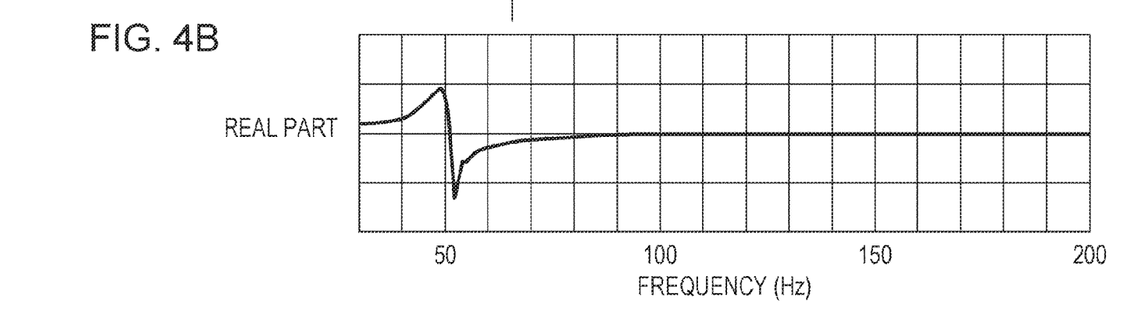
FIG. 4B is a graph illustrating a change in the real part with respect to the frequency.
Figure 4C:
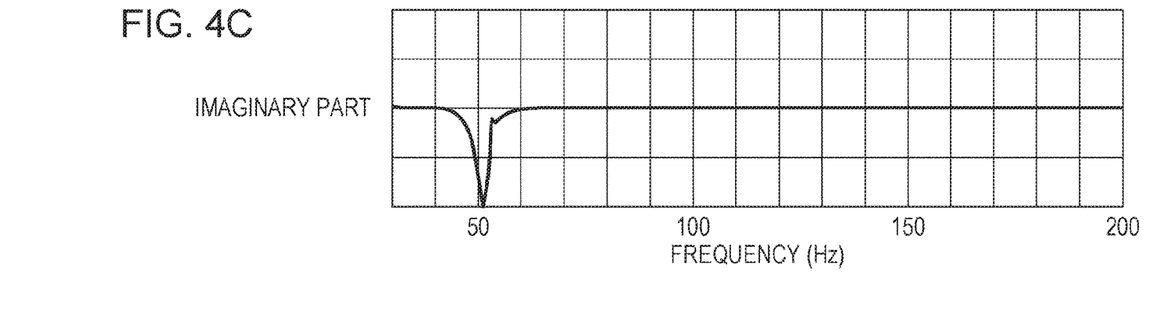
FIG. 4C is a graph illustrating a change in the imaginary part with respect to the frequency.

Regarding a change in the real part with respect to the frequency, FIG. 4B shows that the real part takes a positive value in a frequency range lower than the proper value (50 Hz) and takes a negative value in a frequency range higher than the proper value. Unlike the real part, there is no distinctive difference in the imaginary part, as shown in FIG. 4C.

Based on the above-described fact, by using the following method, the proper value of the dynamic damper 38 using the MREs 18 can follow the target frequency ft determined from the engine speed Ne.

(i) The acceleration of the movable mass 40 (first acceleration a1) is detected by the first acceleration sensor 46a. The acceleration of the vibration controlled member 12 (second acceleration a2) is detected by the second acceleration sensor 46b.

(ii) The target frequency ft is calculated from the engine speed Ne.

(iii) The vibration gain (complex number) of the first acceleration a1 with respect to the second acceleration a2 at the target frequency ft is calculated.

Figure 5A:
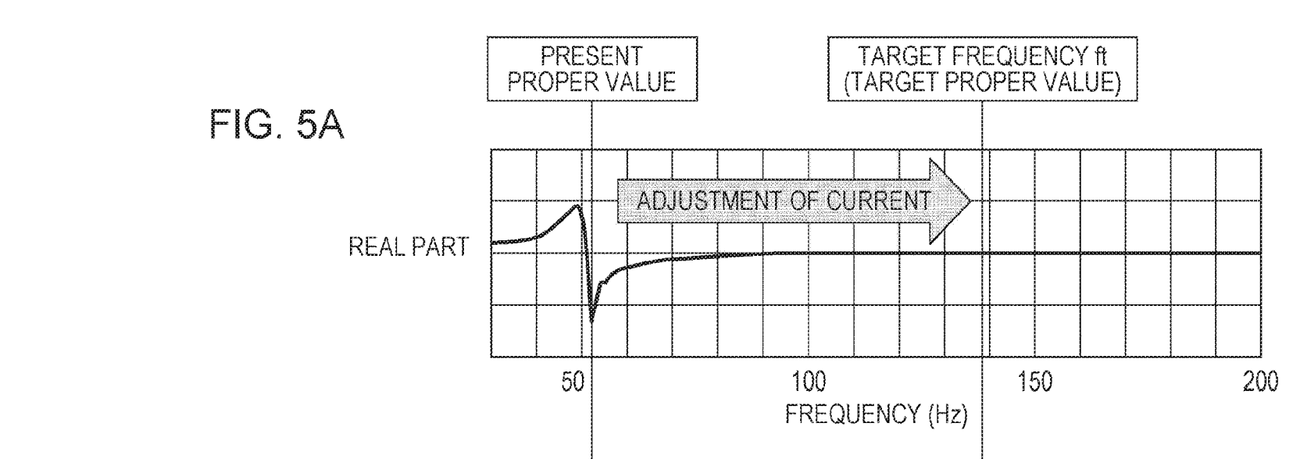
FIGS. 5A and 5B are graphs illustrating an operation for causing the proper value of a dynamic damper to follow a target frequency (target proper value) by adjusting a current supplied to an electromagnet.
Figure 5B:
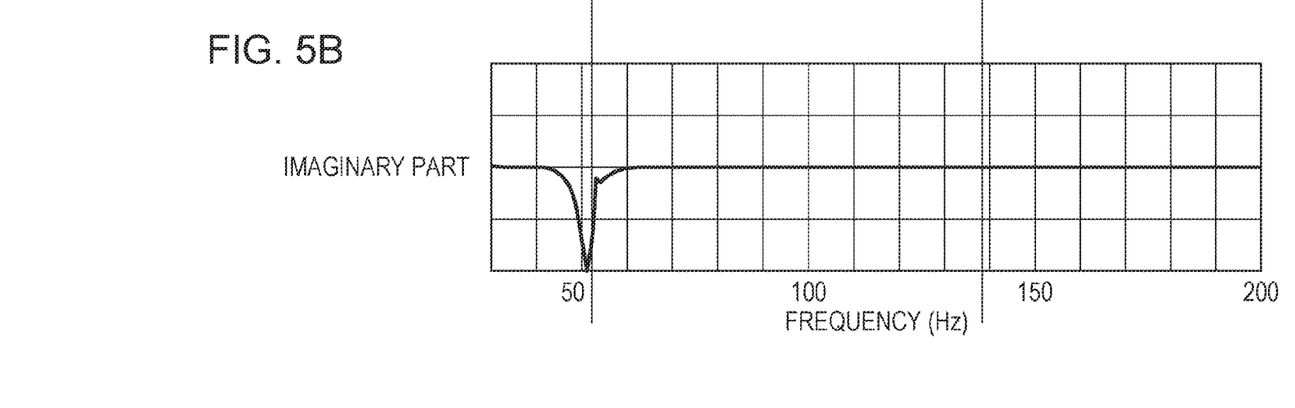

(iv) The current flowing through the windings of the electromagnet 20 is adjusted so that the stiffness of the MREs 18 can be decreased if the real part of the calculated vibration gain is a positive value and so that the stiffness of the MREs 18 can be increased if the real part of the calculated vibration gain is a negative value. This adjustment enables the proper value of the dynamic damper 38 to speedily follow the target frequency ft (target proper value) in real time, as shown in FIGS. 5A and 5B.

Figure 6:
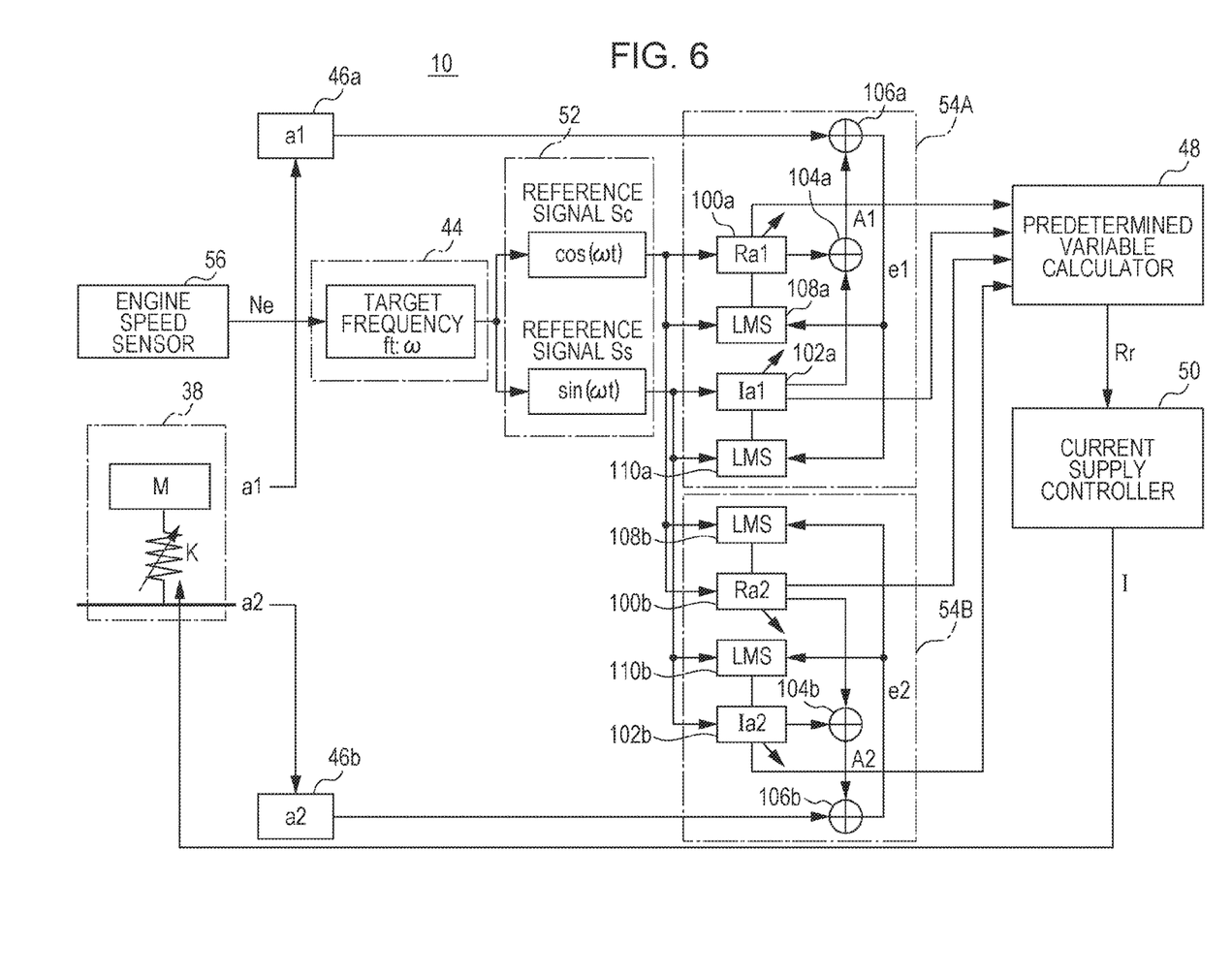
FIG. 6 is a block diagram illustrating the specific configuration of a controller of the dynamic damper control device.

The specific configuration of the controller 22 that achieves the above-described method will be discussed below with reference to FIG. 6.

The target frequency determining unit 44 of the controller 22 determines the target frequency ft based on the engine speed Ne detected by an engine speed sensor 56. The target frequency ft may be determined by a predetermined arithmetic expression using the engine speed Ne as a variable or from a correlation map in which the engine speed Ne and the target frequency ft are associated with each other by simulations or experiments. The predetermined arithmetic expression or the correlation map varies according to the vehicle model, for example, according to the material of the subframe or the structure of a coupling member between the engine and the subframe.

Based on the target frequency ft output from the target frequency determining unit 44, the reference signal generator 52 generates a real-part reference signal Sc ($=\cos(\omega t)$) and an imaginary-part reference signal Ss ($=\sin(\omega t)$) of the target frequency ft (or $\omega = 2 \pi ft$).

The first vibration properties calculator 54A includes a first real-part adaptive filter 100a, a first imaginary-part adaptive filter 102a, and a first adder 104a. The first real-part adaptive filter 100a sets a first real-part filter coefficient Ra1 concerning the first acceleration a1, based on at least the real-part reference signal Sc. The first imaginary-part adaptive filter 102a sets a first imaginary-part filter coefficient Ia1 concerning the first acceleration a1, based on at least the imaginary-part reference signal Ss. The first adder 104a adds the first real-part filter coefficient Ra1 and the first imaginary-part filter coefficient Ia1. Target frequency components constituted by the first real-part filter coefficient Ra1 and the first imaginary-part filter coefficient Ia1 are output from the first adder 104a.

The first vibration properties calculator 54A also includes a first subtractor 106a, a first real-part filter coefficient updater 108a, and a first imaginary-part filter coefficient updater 110a.

The first subtractor 106a subtracts the target frequency components output from the first adder 104a from the target frequency components contained in the first acceleration a1 output from the first acceleration sensor 46a, and outputs a resulting first error signal e1.

The real-part reference signal Sc and the first error signal e1 are input into the first real-part filter coefficient updater 108a. The imaginary-part reference signal Ss and the first error signal e1 are input into the first imaginary-part filter coefficient updater 110a.

The first real-part filter coefficient updater 108a and the first imaginary-part filter coefficient updater 110a respectively update the first real-part filter coefficient Ra1 and the first imaginary-part filter coefficient Ia1 by using least mean square (LMS) algorithms, for example, so that the first error signal e1 output from the first subtractor 106a can be minimized, that is, the target frequency components contained in the first acceleration a1 can be minimized.

The first real-part filter coefficient updater 108a updates the first real-part filter coefficient Ra1 by using the following arithmetic equation.

$$Ra1_{n+1} = Ra1_n - \mu e1 \cos(\omega t)$$

The first imaginary-part filter coefficient updater 110a updates the first imaginary-part filter coefficient Ia1 by using the following arithmetic equation.

$$Ia1_{n+1} = Ia1_n - \mu e1 \sin(\omega T)$$

In the above-described equations, $\mu$ is a positive real number smaller than 1, which is called a step-size parameter.

As in the first vibration properties calculator 54A, the second vibration properties calculator 54B includes a second real-part adaptive filter 100b, a second imaginary-part adaptive filter 102b, and a second adder 104b. The second real-part adaptive filter 100b sets a second real-part filter coefficient Ra2 concerning the second acceleration a2, based on at least the real-part reference signal Sc. The second imaginary-part adaptive filter 102b sets a second imaginary-part filter coefficient Ia2 concerning the second acceleration a2, based on at least the imaginary-part reference signal Ss. The second adder 104b adds the second real-part filter coefficient Ra2 and the second imaginary-part filter coefficient Ia2. Target frequency components constituted by the second real-part filter coefficient Ra2 and the second imaginary-part filter coefficient Ia2 are output from the second adder 104b.

The second vibration properties calculator 54B also includes a second subtractor 106b, a second real-part filter coefficient updater 108b, and a second imaginary-part filter coefficient updater 110b.

The second subtractor 106b subtracts the target frequency components output from the second adder 104b from the target frequency components contained in the second acceleration a2 output from the second acceleration sensor 46b, and outputs a resulting second error signal e2.

The real-part reference signal Sc and the second error signal e2 are input into the second real-part filter coefficient updater 108b. The imaginary-part reference signal Ss and the second error signal e2 are input into the second imaginary-part filter coefficient updater 110b.

The second real-part filter coefficient updater 108b and the second imaginary-part filter coefficient updater 110b respectively update the second real-part filter coefficient Ra2 and the second imaginary-part filter coefficient Ia2 by using LMS algorithms, for example, so that the second error signal e2 output from the second subtractor 106b can be minimized, that is, the target frequency components contained in the second acceleration a2 can be minimized.

The predetermined variable calculator 48 calculates a predetermined variable Rr of a transfer function R of the first acceleration a1 with respect to the second acceleration a2 at the target frequency ft, based on the first and second real-part filter coefficients Ra1 and Ra2 and the first and second imaginary-part filter coefficients Ia1 and Ia2.

The transfer function R can be found by the following equation (1).

$$R = \frac{Ra1 + iIa1}{Ra2 + iIa2}$$
$$= \frac{(Ra1 + iIa1)(Ra2 - iIa2)}{(Ra2 + iIa2)(Ra2 - iIa2)}$$
$$= \frac{(Ra1 \cdot Ra2 - Ia1 \cdot Ia2) + i(Ra2 \cdot Ia1 - Ra1 \cdot Ia2)}{(Ra2 + iIa2)(Ra2 - iIa2)} \quad (1)$$

The predetermined variable Rr of the transfer function R is a coefficient proportional to the real part of the transfer function R, that is, Rr=(Ra1·Ra2−Ia1·Ia2).

This calculation is less complex to conduct than calculation for a complicated transfer function R. That is, this calculation can be conducted with fewer calculation steps by using a control unit constituted by an inexpensive processor including a fixed-point arithmetic unit.

If the predetermined variable Rr calculated by the predetermined variable calculator 48 is a positive value (positive sign), the current supply controller 50 decreases the current I supplied to the electromagnet so as to reduce the magnetic force applied to the MREs 18. Conversely, if the predetermined variable Rr is a negative value (negative sign), the current supply controller 50 increases the current I supplied to the electromagnet 20 so as to enhance the magnetic force applied to the MREs 18.

This control operation is performed merely based on the sign of the predetermined variable Rr. Thus, as in the calculation of the predetermined variable Rr, this control operation can also be conducted with fewer calculation steps by using the above-described control unit.

Figure 7:
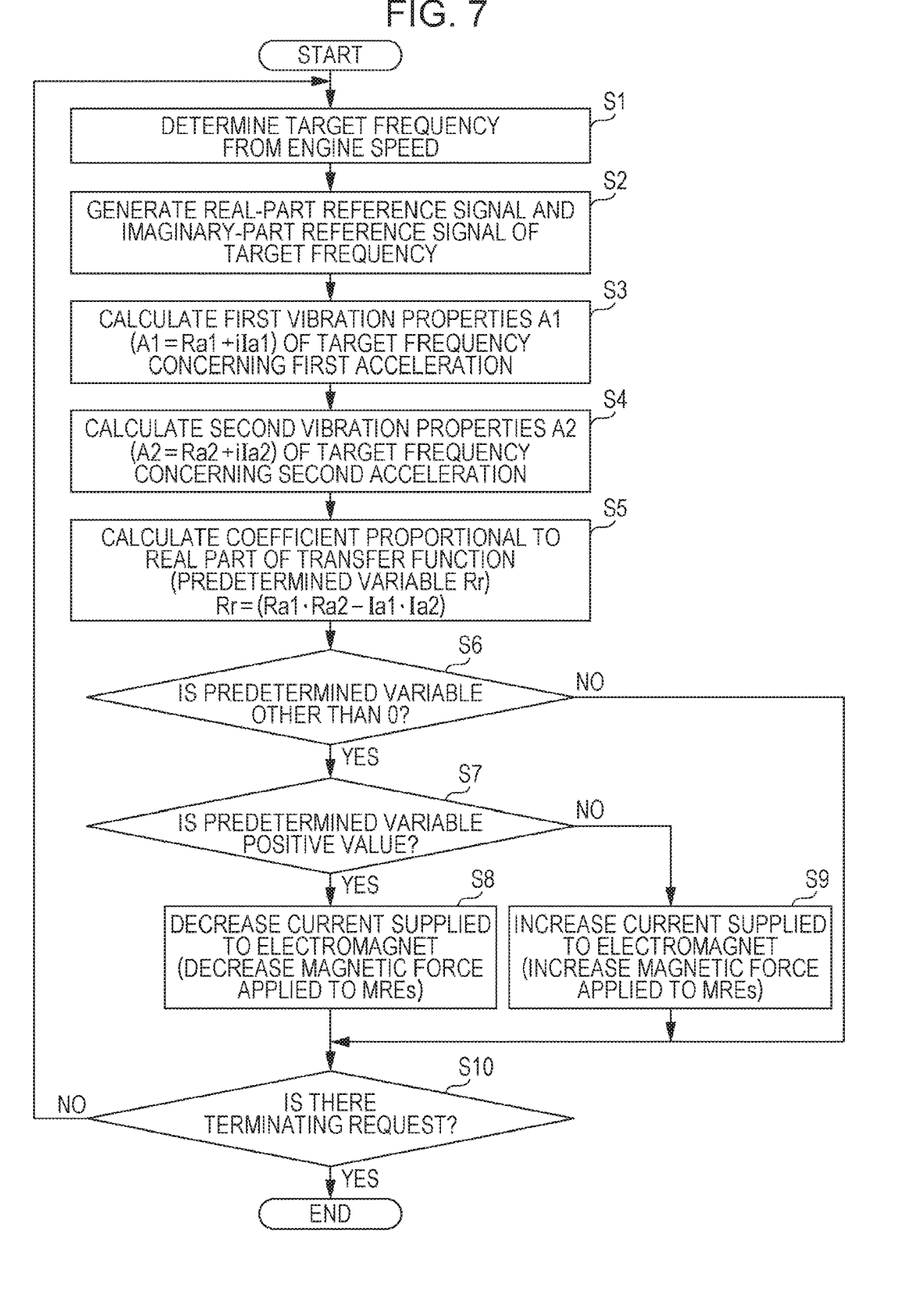
FIG. 7 is a flowchart illustrating a processing operation executed by the controller of the dynamic damper control device.

The processing operation executed by the controller 22 of the dynamic damper control device 10 will be described below with reference to the flowchart of FIG. 7.

In step S1, the target frequency determining unit 44 determines the target frequency ft from the engine speed Ne.

In step S2, based on the target frequency ft output from the target frequency determining unit 44, the reference signal generator 52 generates a real-part reference signal Sc and an imaginary-part reference signal Ss of the target frequency ft.

In step S3, the first vibration properties calculator 54A calculates first vibration properties A1=Ra1+iIa1 of the target frequency ft concerning the first acceleration a1, based on the first acceleration a1 output from the first acceleration sensor 46a. The first vibration properties A1 correspond to the output from the first adder 104a shown in FIG. 6.

In step S4, the second vibration properties calculator 54B calculates second vibration properties A2=Ra2|iIa2 of the target frequency ft concerning the second acceleration a2, based on the second acceleration a2 output from the second acceleration sensor 46b. The second vibration properties A2 correspond to the output from the second adder 104b shown in FIG. 6.

In step S5, based on the first vibration properties A1 and the second vibration properties A2, the predetermined variable calculator 48 calculates a coefficient proportional to the real part of the transfer function R=A1/A2, that is, the predetermined variable Rr=(Ra1·Ra2−Ia1·Ia2).

In step S6, the current supply controller 50 determines whether the predetermined variable Rr is other than 0. If the predetermined variable Rr is other than 0, the current supply controller 50 proceeds to step S7 to determine whether the predetermined variable Rr is a positive value. If the predetermined variable Rr is a positive value, the current supply controller 50 proceeds to step S8. In step S8, the current supply controller 50 decreases the current I supplied to the electromagnet 20 so as to reduce the magnetic force applied to the MREs 18.

If the predetermined variable Rr is found to be a negative value in step S7, the current supply controller 50 proceeds to step S9. In step S9, the current supply controller 50 increases the current I supplied to the electromagnet 20 so as to enhance the magnetic force applied to the MREs 18.

If the predetermined variable Rr is found to be 0 in step S6 or if step S8 or S9 has been completed, the controller 22 proceeds to step S10. In step S10, the controller 22 determines whether there is a terminating request (power OFF or maintenance request) for the dynamic damper control device 10. If there is no terminating request, the controller 22 returns to step S1 and repeats steps. If there is a terminating request, the controller 22 terminates the processing operation.

The dynamic damper control device 10 according to this embodiment implements a control method for adjusting the frequency of the dynamic damper 38 by causing it to follow the frequency of a subject vibration (target frequency). This control method does not require an expensive processor, such as a digital signal processor (DSP), which is used for high-load calculations, such as those in FFT, but requires only a control unit constituted by an inexpensive processor including a fixed-point arithmetic unit. Additionally, instead of calculating the transfer function R of the first acceleration a1 with respect to the second acceleration a2 at the target frequency ft, the predetermined variable Rr, which is a coefficient proportional to the real part of the transfer function R, is calculated. The calculation speed is thus increased, so that the frequency of the dynamic damper 38 can follow the target frequency speedily. It is thus possible to speedily reduce the vibration of the vibration controlled member 12 to which the dynamic damper 38 is attached.

A dynamic damper control device 10a according to a modified example of the above-described embodiment will be described below with reference to FIG. 8.

The dynamic damper control device 10a can be suitably used when the phase difference with respect to the proper value is not −90°, for example, it is −45°, due to a high attenuation of the MREs 18.

Figure 8:
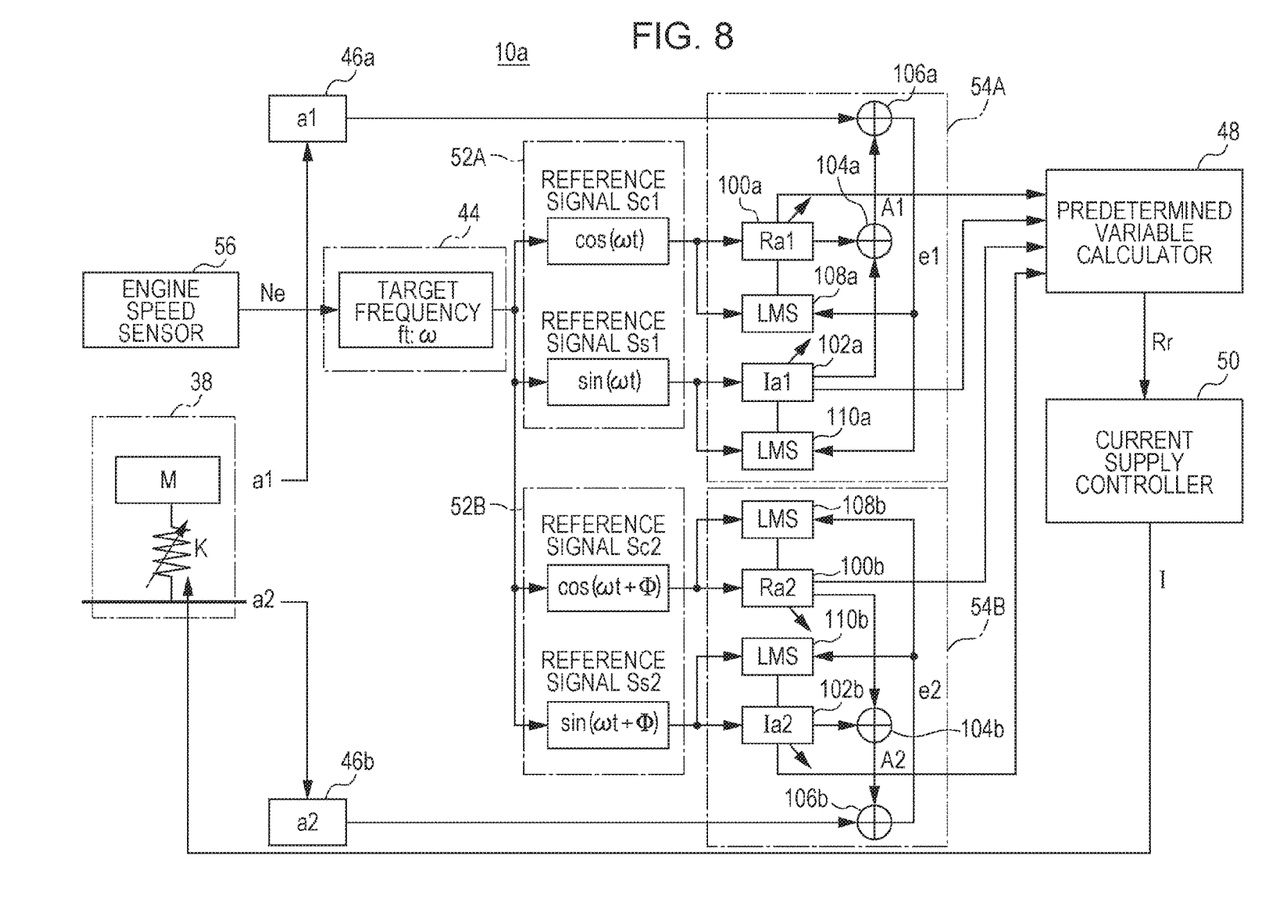
FIG. 8 is a block diagram illustrating the specific configuration of a controller of a dynamic damper control device according to a modified example.

The configuration of the dynamic damper control device 10a is substantially the same as that of the dynamic damper control device 10, except that the dynamic damper control device 10a includes a first reference signal generator 52A that generates a first reference signal concerning the first acceleration a1 and a second reference signal generator 52B that generates a second reference signal concerning the second acceleration a2, as shown in FIG. 8.

Based on the target frequency ft output from the target frequency determining unit 44, the first reference signal generator 52A generates a first real-part reference signal Sc1 (=cos(ωt)) and a first imaginary-part reference signal Ss1 (=sin(ωt)) of the target frequency ft (or ω=2 πft) concerning the first acceleration a1.

Based on the target frequency ft output from the target frequency determining unit 44, the second reference signal generator 52B generates a second real-part reference signal Sc2 (=cos(ωt+φ)) and a second imaginary-part reference signal Ss2 (=sin(ωt−φ)) of the target frequency ft (or ω=2 πft) concerning the second acceleration a2. If the phase difference with respect to the proper value is −45°, for example, ϕ is set to be 45°. If the phase difference with respect to the proper value is −50°, for example, ϕ is set to be 50°.

This configuration makes it possible to correctly calculate the predetermined variable Rr even when the attenuation of the MREs 18 is high. For example, the attenuation of the MREs 18 may become high as the dynamic damper 38 changes over time. Even in this case, by setting the predetermined phase difference ϕ in accordance with the phase difference of the transfer function R at the target frequency ft, the predetermined variable Rr reflecting the properties of the MREs 18 can easily be obtained without making significant design change. As a result, stable current supply control for the dynamic damper 38 is achieved, thereby effectively reducing the vibration of the vibration controlled member 12 to which the dynamic damper 38 is attached.

Conclusion of Embodiment

The dynamic damper control device 10 according to the above-described embodiment includes a vibration controlled member 12, a mounting member 14, MREs 18, an electromagnet 20, and a controller 22 (elasticity properties controller). The vibration controlled member 12 vibrates in accordance with a vibration source. The mounting member 14 is interconnected to the vibration controlled member 12. The MREs 18 elastically connect the mounting member 14 and a mass member 16. The electromagnet 20 generates a magnetic force to be applied to the MREs 18. The controller 22 controls the elasticity properties of the MREs 18 by adjusting the current to be supplied to the electromagnet 20.

The controller 22 includes a target frequency determining unit 44, first and second acceleration sensors 46a and 46b, and a predetermined variable calculator 48. The target frequency determining unit 44 determines a target frequency ft from the vibration state of a vibration source. The first acceleration sensor 46a obtains a first acceleration a1 of the mass member 16. The second acceleration sensor 46b obtains a second acceleration a2 of the vibration controlled member 12. The predetermined variable calculator 48 calculates a predetermined variable Rr of a transfer function R of the first acceleration a1 with respect to the second acceleration a2 at the target frequency ft. Unless the predetermined variable Rr is 0, the controller 22 changes the magnetic force generated in the electromagnet 20.

In this embodiment, if the predetermined variable Rr of the transfer function R is a positive value, the controller 22 may decrease the magnetic force generated in the electromagnet 20. If the predetermined variable Rr of the transfer function R is a negative value, the controller 22 may increase the magnetic force generated in the electromagnet 20.

The predetermined variable Rr may preferably be a coefficient proportional to the real part of the transfer function R which is expressed as a complex number.

In this embodiment, the controller 22 may include first and second reference signal generators 52A and 52B and first and second vibration properties calculators 54A and 54B. The first reference signal generator 52A generates a first reference signal (Sc1, Ss1), based on the target frequency ft. The second reference signal generator 52B generates a second reference signal (Sc2, Ss2), based on the target frequency ft. The second reference signal (Sc2, Ss2) reflects a predetermined phase difference ϕ with respect to the first reference signal (Sc1, Ss1). Based on the first reference signal (Sc1, Ss1), the first vibration properties calculator 54A calculates first vibration properties A1 expressed as a complex number concerning the first acceleration a1. Based on the second reference signal (Sc2, Ss2), the second vibration properties calculator 54B calculates second vibration properties A2 expressed as a complex number concerning the second acceleration a2.

In this case, the predetermined variable calculator 48 may preferably calculate, as the predetermined variable Rr, a coefficient proportional to the real part of the transfer function R expressed as a complex number. The transfer function R is obtained by dividing the first vibration properties A1 by the second vibration properties A2.

The present disclosure is not restricted to the above-described embodiment, and various modifications may be made based on the description of the embodiment. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A dynamic damper control device comprising:
a vibration controlled object that vibrates in accordance with a vibration source;
a mounting member that is connected to the vibration controlled object;
a magnetorheological elastomer that elastically connects the mounting member and a mass member;
an electromagnet that generates a magnetic force to be applied to the magnetorheological elastomer; and
an elasticity properties controller that controls elasticity property of the magnetorheological elastomer by adjusting a current supplied to the electromagnet,
the elasticity properties controller including:
a target frequency determining unit that determines a target frequency by using a vibration state of the vibration source,
a first acceleration obtaining unit that obtains a first acceleration of the mass member,
a second acceleration obtaining unit that obtains a second acceleration of the vibration controlled object, and
a predetermined variable calculator that calculates a predetermined variable of a transfer function of the first acceleration with respect to the second acceleration at the target frequency,
wherein, if the predetermined variable is a numeric value other than 0, the elasticity properties controller changes the magnetic force generated in the electromagnet.

2. The dynamic damper control device according to claim 1, wherein, if the predetermined variable is a positive numeric value, the elasticity properties controller decreases the magnetic force generated in the electromagnet, and if the predetermined variable is a negative numeric value, the elasticity properties controller increases the magnetic force generated in the electromagnet.

3. The dynamic damper control device according to claim 1, wherein the predetermined variable is a coefficient proportional to a real part of the transfer function which is expressed as a complex number.

4. The dynamic damper control device according to claim 1, wherein the elasticity properties controller includes a first reference signal generator that generates a first reference signal by using the target frequency, a second reference signal generator that generates a second reference signal by using the target frequency, the second reference signal reflecting a predetermined phase difference with respect to the first reference signal, a first vibration properties calculator that calculates, using the first reference signal, a first vibration property expressed as a complex number concerning the first acceleration, and a second vibration properties calculator that calculates, using the second reference signal, a second vibration property expressed as a complex number concerning the second acceleration, wherein the predetermined variable calculator calculates, as the predetermined variable, a coefficient proportional to a real part of the transfer function expressed as a complex number, the transfer function being obtained by dividing the first vibration property by the second vibration property.

5. The dynamic damper control device according to claim 1, wherein the predetermined variable calculator calculates the predetermined variable of the transfer function of the first acceleration with respect to the second acceleration at the target frequency without calculating the transfer function itself.

6. The dynamic damper control device according to claim 1, wherein, if the predetermined variable is a numeric value of 0, the elasticity properties controller does not change the magnetic force generated in the electromagnet.

7. A dynamic damper control method comprising steps of:
determining, by using a processor, a target frequency by using a vibration state of a vibration source;
obtaining a first acceleration of a mass member by means of a sensor;
obtaining a second acceleration of a vibration controlled object by means of a sensor;
calculating, by using the processor, a predetermined variable of a transfer function of the first acceleration with respect to the second acceleration at the target frequency;
if the predetermined variable is a numeric value other than 0, changing a magnetic force generated in a electromagnet that generates a magnetic force to be applied to a magnetorheological elastomer that elastically connects the vibration controlled object and the mass member.

* * * * *